US008705536B2

(12) United States Patent
Subrahmaniam et al.

(10) Patent No.: US 8,705,536 B2
(45) Date of Patent: Apr. 22, 2014

(54) METHODS OF OPERATING FORWARDING ELEMENTS INCLUDING SHADOW TABLES AND RELATED FORWARDING ELEMENTS

(75) Inventors: Ramesh Subrahmaniam, San Jose, CA (US); Ravi Manghirmalani, San Jose, CA (US)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 171 days.

(21) Appl. No.: 13/412,490

(22) Filed: Mar. 5, 2012

(65) Prior Publication Data

US 2013/0230047 A1    Sep. 5, 2013

(51) Int. Cl.
*H04L 12/56* (2011.01)
(52) U.S. Cl.
USPC .......................................... 370/392; 370/389
(58) Field of Classification Search
USPC .................................. 370/254–350, 392, 389
See application file for complete search history.

(56) References Cited

U.S. PATENT DOCUMENTS

| 8,169,910 | B1 * | 5/2012 | Kohn et al. | 370/235 |
| 8,391,289 | B1 * | 3/2013 | Yalagandula et al. | 370/392 |
| 2005/0220129 | A1 | 10/2005 | Boyd | |
| 2009/0327367 | A1 * | 12/2009 | Mehra et al. | 707/205 |

FOREIGN PATENT DOCUMENTS

| EP | 2562970 A1 | 2/2013 |
| WO | WO 2011/132568 A1 | 10/2011 |

OTHER PUBLICATIONS

OpenFlow Switch Specification, Version 1.0.0 (Wire Protocol 0x01), Dec. 31, 2009, the whole document.
OpenFlow Switch Specification, Version 1.1.0 Implemented (Wire Protocol 0x02 ), Feb. 28, 2011, the whole document.
Zoltan, L, et al. "OpenFlow Switch Specification," Internet citation, pp. 1-83, Dec. 5, 2011.

* cited by examiner

*Primary Examiner* — Ayaz Sheikh
*Assistant Examiner* — Debebe Asefa

(57) ABSTRACT

A method may be provided to operate a forwarding element in a forwarding plane of a network including the forwarding plane and a control plane. The method may include receiving a packet through an input/output port of the forwarding element and attempting to match the packet with a flow table of the forwarding element. Responsive to the packet missing a match with the flow table, the forwarding element may attempt to match the packet with a shadow table of the forwarding element. Responsive to the packet matching with the shadow table, a new flow rule may be installed in the flow table based on a matching shadow rule from the shadow table. Related forwarding elements are also discussed.

20 Claims, 6 Drawing Sheets

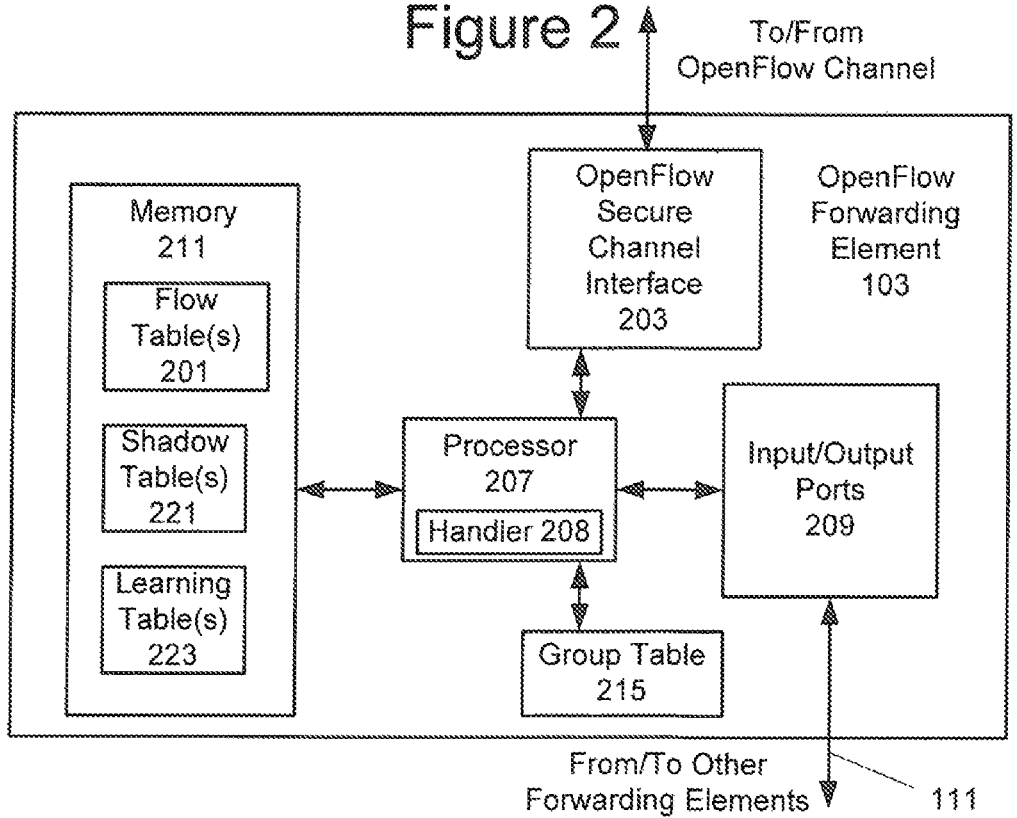
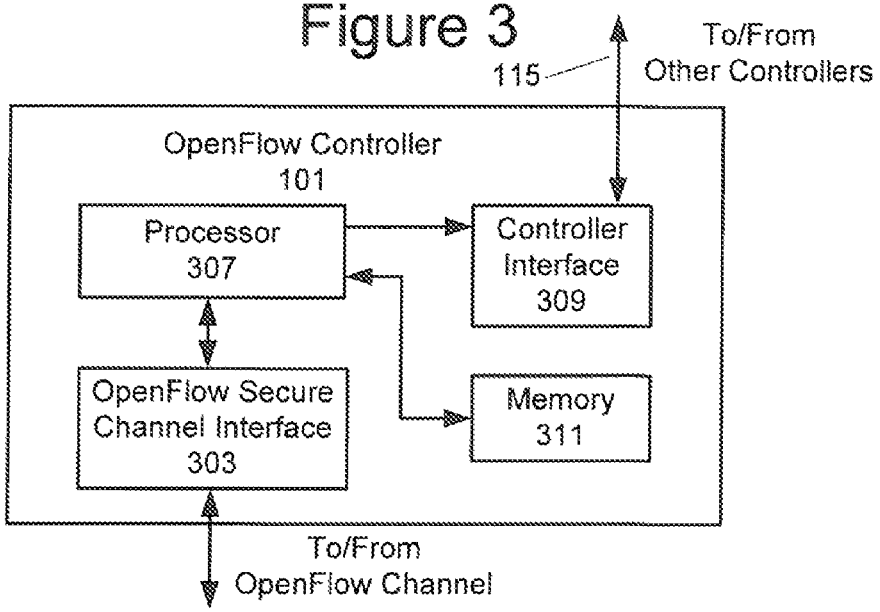

Figure 7

| | | |
|---|---|---|
| Input Port | * | * |
| Metadata | * | * |
| Ethernet dst | * | * |
| Ethernet src | * | * |
| Ethernet Type | * | * |
| VLAN ID | * | * |
| VLAN Priority | * | * |
| MPLS Label | * | * |
| MPLS Tr. Class | * | * |
| IPV4 src | IP Serv | IP Cli |
| IPV4 dst | IP Cli | IP Serv |
| IPV4 Proto/Arp | 4 | 4 |
| IPV4 ToS Bits | * | * |
| TCP/UDP/SCTP src port/CMP | 50001 | 50002 |
| TCP/UDP/SCTP dst port/CMP Code | 50002 | 50001 |

METHODS OF OPERATING FORWARDING ELEMENTS INCLUDING SHADOW TABLES AND RELATED FORWARDING ELEMENTS

TECHNICAL FIELD

The present disclosure is directed to communications and, more particularly, to network communication methods and related network elements.

BACKGROUND

Most modern Ethernet forwarding elements (e.g., switches and routers) include flow-tables (typically built from TCAMs or Ternary Content Addressable Memories) that run at line-rate to implement firewalls, NAT (network address translation), and QoS (quality of service), and to collect statistics. While flow-tables of different vendors may be different, OpenFlow exploits a common set of functions that run in many switches and routers.

OpenFlow provides an open protocol to program flowtables in different forwarding elements (e.g., switches and routers). A network administrator, for example, can partition traffic into production and research flows, and/or researchers can control their own flows by choosing the routes their packets follow and the processing they receive. In this way, researchers can try new routing protocols, security models, addressing schemes, and even alternatives to IP (Internet Protocol). On the same network, the production traffic may be isolated and processed conventionally.

The datapath of an OpenFlow forwarding element (e.g., switch) may include a flow table, and an action associated with each flow rule (also referred to as a flow entry) included in the flow table. The set of actions supported by an OpenFlow forwarding element may be extensible. For high-performance and low-cost, the datapath may have a carefully prescribed degree of flexibility, which may mean forgoing the ability to specify arbitrary handling of each packet and seeking a more limited, but still useful, range of actions.

An OpenFlow forwarding element may include a flow table having a plurality of flow rules (with an action associated with each flow rule) to tell the forwarding element how to process the respective flow, a secure channel that connects the switch to a remote OpenFlow controller (allowing commands and packets to be sent between the controller and the forwarding element using the OpenFlow Protocol (which provides an open and standard way for a controller to communicate with a forwarding element). By specifying a standard interface (the OpenFlow Protocol) through which rules/entries in the forwarding element Flow Table can be defined using an external controller, researchers may not need to individually program OpenFlow forwarding elements.

An OpenFlow forwarding element may include one or more flow tables and a group table (which may perform packet lookups and forwarding) and an OpenFlow channel to an external OpenFlow controller. The OpenFlow controller manages the forwarding element via the OpenFlow protocol. Using this protocol, the controller can add, update, and delete flow rules/entries, both reactively (in response to packets received at the forwarding element) and proactively (e.g., to program flow tables of a new forwarding element).

Each flow table in the forwarding element may include a set of flow rules/entries. Each flow rule/entry may include matched fields, counters, and a set of instructions to apply to matching packets.

Matching at a forwarding element may start at a first flow table (also referred to as a primary flow table) and may continue to additional flow tables of the forwarding element. Flow rules/entries match data packets in priority order, with the first matching rule/entry in each table being used. If a matching rule/entry is found for a data packet in a flow table, the instructions associated with the specific flow rule/entry are executed for the data packet. If no match is found for the data packet in a flow table, the outcome may depend on forwarding element configuration. The data packet may be forwarded to the controller over the OpenFlow channel, the data packet may be dropped, or attempts to match the data packet may continue to a next flow table of the forwarding element.

Instructions associated with each flow rule/entry describe data packet forwarding, data packet modification, group table processing, and pipeline processing. Pipeline processing instructions allow data packets to be sent to subsequent tables for further processing and allow information (e.g., in the form of metadata) to be communicated between tables. Table pipeline processing may stop when the instruction set associated with a matching flow rule/entry does not specify a next table. At this point, the data packet may usually be modified and forwarded.

Flow rules/entries may forward respective data packets to a port. This is usually a physical port, but it may also be a virtual port defined by the switch or a reserved virtual port defined by the OpenFlow switch specification. Reserved virtual ports may specify generic forwarding actions such as sending to the controller, flooding, or forwarding using non-OpenFlow methods, such as "normal" switch processing, while switch-defined virtual ports may specify link aggregation groups, tunnels or loopback interfaces.

Flow rules/entries may also point to a group, which specifies additional processing. Groups represent sets of actions for flooding, as well as more complex forwarding semantics (e.g., multipath, fast reroute, and link aggregation). As a general layer of indirection, groups also enable multiple flows to forward to a single identifier (e.g., IP forwarding to a common next hop). This abstraction may allow common output actions across flows to be changed efficiently.

A group table may include group entries, with each group entry including a list of action buckets with specific semantics dependent on group type. The actions in one or more action buckets are applied to data packets sent to the group.

OpenFlow forwarding elements (e.g., switches and/or routers), controllers, and protocols are discussed, for example, in "OpenFlow Switch Specification," Version 1.1.0 Implemented (Wire Protocol 0x02), Feb. 28, 2011, and in the reference by McKeown et al. entitled "OpenFlow: Enabling Innovation In Campus Networks," Mar. 14, 2008. The disclosures of both of the above referenced documents are hereby incorporated herein in their entireties by reference.

The OpenFlow channel is an interface that connects an OpenFlow forwarding element with a controller over an OpenFlow interface. The interface itself may be implementation specific, and it may be implemented using a TCP (Transmission Control Protocol) connection or a SCTP (Stream Control Transmission Protocol) connection. Moreover, TLS (Transport Layer Security) may be used to send messages that are encrypted by the controller and decrypted by the forwarding element.

Notwithstanding networks discussed above, there continues to exist a need in the art for improved operations in networks including forwarding elements and controllers.

SUMMARY

It is therefore an object to address at least some of the above mentioned disadvantages and/or to improve network performance.

According to some embodiments, a method may be provided to operate a forwarding element in a forwarding plane of a network including the forwarding plane and a control plane. The method may include receiving a packet through an input/output port of the forwarding element and attempting to match the packet with a flow table of the forwarding element. Responsive to the packet missing a match with the flow table, an attempt to match the packet with a shadow table of the forwarding element may be executed. Responsive to the packet matching with the shadow table, a new flow rule may be installed in the flow table based on a matching shadow rule from the shadow table.

Moreover, installing the new flow rule may include installing the new flow rule in the flow table based on the matching shadow rule from the shadow table without transmitting the packet from the forwarding element to a control plane of the network. The packet may be processed through the forwarding element according to a matching shadow rule from the shadow table and/or according to the new flow rule. By using shadow rules to install flow rules, communication traffic between the forwarding element and the control plane may be reduced, and/or processing burden at the control plane may be reduced.

Responsive to the packet missing a match with the flow table and responsive to the packet missing a match with the shadow table, a packet-in message may be transmitted to a controller in the control plane of the network, with the packet-in message including the packet.

The packet may be a data packet, and responsive to the data packet missing a match with the flow table and responsive to the data packet missing a match with the shadow table, a learning table of the forwarding element may be updated to associate a source of the data packet with the input/output port. Moreover, the data packet may be a first data packet. Responsive to receiving a shadow modification message from the controller corresponding to the packet-in message, a shadow rule may be installed in the shadow table associating subsequent data packets from a source identified by a destination address of the first data packet with a virtual internal port of the forwarding element. After installing the shadow rule, a second data packet may be received through an input/output port of the forwarding element, with the second data packet having a source address matching the destination address of the first data packet. An attempt to match the second data packet with the flow table of the forwarding element may be executed. Responsive to the second data packet missing a match with the flow table, an attempt to match the second data packet with the shadow table of the forwarding element may be executed. Responsive to the second data packet matching the shadow rule of the shadow table, a new flow rule may be installed in the flow table based on a matching shadow rule from the shadow table. The second data packet may be processed through the forwarding element according to a matching shadow rule from the shadow table and/or according to the new flow rule.

The packet may be a first control packet received at a control port of the forwarding element for a session between a client device and a server device. Responsive to receiving a shadow modification message from the controller corresponding to the packet-in message, a shadow rule may be installed in the shadow table matching subsequent control packets received at the control port and having a source address matching either of a source and/or destination address of the first control packet and/or having a destination address matching either of the source and/or destination address of the first control packet wherein the shadow rule identifies port commands from matching control packets.

After installing the shadow rule, a second control packet may be received through the control port of the forwarding element, with the second control packet having a source address matching either of the source and/or destination address of the first control packet and/or a destination address matching either of the source and/or destination address of the first control packet. An attempt to match the second control packet with the flow table of the forwarding element may be executed. Responsive to the second control packet missing a match with the flow table, an attempt to match the second control packet with the shadow table of the forwarding element may be executed. Responsive to the second control packet matching the shadow rule of the shadow table, an expression engine of the shadow rule may be executed to identify a command type of the second control packet. Responsive to identifying a command type of the second control packet, a new flow rule may be installed in the flow table based on the command type of the second control packet. The second control packet may be forwarded from an input/output port of the forwarding element to a destination.

The second control packet may include a port command control packet identifying a data port to be used for subsequent data packets transmitted between the client and server devices, and installing the new flow rule may include installing the new flow rule to define a pinhole to be used for subsequent data packets transmitted between the client and server devices. After installing the new flow rule, a data packet may be received having a source address matching either of a source and/or destination address of the first control packet and/or having a destination address matching either of the source and/or destination address of the first control packet. An attempt to match the data packet with the flow table of the forwarding element may be executed, and responsive to the data packet matching with the new flow rule of the flow table, the data packet may be processed in accordance with the pinhole defined by the new flow rule.

The packet may be a first packet, and responsive to receiving a shadow modification message from the controller corresponding to the packet-in message, a shadow rule may be installed in the shadow table defining a range/list of addresses and/or ports and a new flow rule associated with a source and/or a destination address of the first packet. After installing the shadow rule, a second packet may be received through an input/output port of the forwarding element, with the second packet having a source address matching either of the source and/or destination address of the first packet and/or a destination address matching either of the source and/or destination address of the first packet.

An attempt to match the second packet with the flow table of the forwarding element may be executed, and responsive to the second packet missing a match with the flow table, an attempt to match the second packet with the shadow table of the forwarding element may be executed. Responsive to the second packet matching the shadow rule of the shadow table, a source and/or a destination port of the second packet may be compared with the range/list of addresses and/or ports defined by the shadow rule. Responsive to the source and/or destination port of the second packet matching the range/list of addresses and/or ports defined by the shadow rule, a new flow rule may be installed in the flow table for packets having a source address matching the source and/or destination address of the first packet and/or having a destination address matching the source and/or destination address of the first packet and having the address and/or port from the second packet. The second packet may be forwarded from an input/output port of the forwarding element to a destination. After installing the new flow rule, a third packet may be received having a source address matching either of a source and/or destination address of the first packet and/or having a destination address matching either of the source and/or destination address of the first packet and having the address and/or port from the second packet. An attempt to match the third packet with the flow table of the forwarding element may be executed, and responsive to the data packet matching with the new flow rule of the flow table, the data packet may be processed in accordance with the new flow rule.

The network may be an OpenFlow network, with the forwarding plane being an OpenFlow forwarding plane, with the forwarding element being an OpenFlow forwarding element, with the control plane being an OpenFlow control plane, and with the controller being an OpenFlow Controller. Moreover, transmitting the packet-in message to the controller may include transmitting the packet-in message over an OpenFlow channel between the OpenFlow forwarding element and the OpenFlow controller. Moreover, the packet may be processed through the forwarding element according to a matching flow rule of the flow table responsive to the packet matching with the flow table.

According to some other embodiments a forwarding element may be provided in a forwarding plane of a network including the forwarding plane and a control plane. The forwarding element may include a plurality of input/output ports configured to provide communications with other forwarding elements of the forwarding plane, and a processor coupled to the plurality of input/output ports. The processor may be configured to receive a packet through an input/output port of the forwarding element, to attempt to match the packet with a flow table of the forwarding element, to attempt to match the packet with a shadow table of the forwarding element responsive to the packet missing a match with the flow table, and to install a new flow rule in the flow table based on a matching shadow rule from the shadow table responsive to the packet matching with the shadow table.

BRIEF DESCRIPTION OF THE DRAWINGS

The accompanying drawings, which are included to provide a further understanding of the disclosure and are incorporated in and constitute a part of this application, illustrate certain non-limiting embodiment(s) of the invention. In the drawings:

FIG. 2 is a block diagram illustrating a forwarding element of FIG. 1 according to some embodiments;

FIG. 3 is a block diagram illustrating a controller of FIG. 1 according to some embodiments;

FIG. 7 is a diagram illustrating rules to bidirectionally pass traffic between client and server devices.

DETAILED DESCRIPTION

Figure 1:
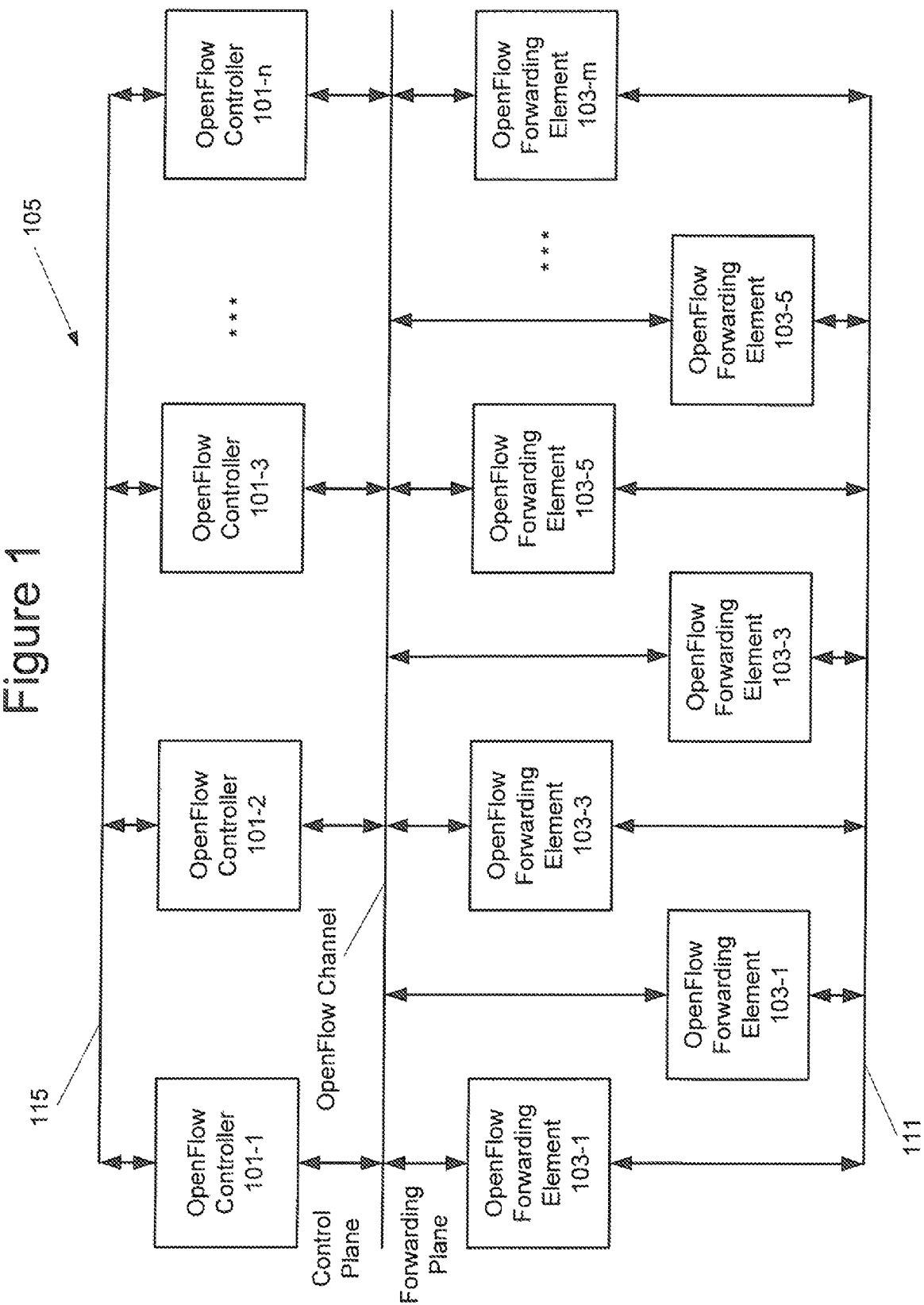
FIG. 1 is a block diagram illustrating a network including controllers and forwarding elements according to some embodiments.

Embodiments of the present invention will now be described more fully hereinafter with reference to the accompanying drawings, in which examples of embodiments of the invention are shown. This invention may, however, be embodied in many different forms and should not be construed as limited to the embodiments set forth herein. It should also be noted that these embodiments are not mutually exclusive. Components from one embodiment may be tacitly assumed to be present/used in one or more other embodiments.

According to some embodiments discussed herein, an OpenFlow forwarding element 103 may be coupled to a single OpenFlow controller 101 over the OpenFlow channel. According to some other embodiments, the OpenFlow protocol may be extended to provide redirection of connection between an OpenFlow forwarding element in a network forwarding plane from one OpenFlow controller to another OpenFlow controller in a network control plane, as discussed in U.S. application Ser. No. 13/369,993, filed Feb. 9, 2012, and entitled "Methods of Redirecting Network Forwarding Elements and Related Forwarding Elements and Controllers".

In some OpenFlow networks, an OpenFlow forwarding element has a primary flow table including multiple flow rules/entries, and an OpenFlow pipeline defines how packets are processed within the OpenFlow forwarding element. If a packet does not match in the primary flow table, the packet may be considered a table miss.

A primary flow table miss may occur when a packet does not match any flow rules/entries of the primary flow table, and treatment of a packet that results in a primary flow table miss may depend on a configuration of the primary flow table. The default may be to send the packet to the controller using a packet-in message or to drop the packet. In OpenFlow 1.1, another option is to continue packet processing with a next flow table if there is more than one flow table in the pipeline.

In OpenFlow 1.1, each packet arriving at an ingress port (also referred to as an input port) may be saved and passed on to a next table for further processing. The packet is matched with the flow rules/entries in the flow tables, the forwarding element executes actions on the packet defined by any flow rules/entries that match the packet, and a packet that results in a table miss may be treated as discussed above.

A packet arriving at an ingress/input port of an OpenFlow forwarding element may be processed by matching a header of the packet with the flow rules/entries in the primary flow table. The match criteria may be applied according to OpenFlow rules. If there is a match (also referred to as a hit), the corresponding instructions of the matching flow rule/entry are executed. If the packet does not match any flow rules/entries of the primary flow table (also referred to as a miss), the forwarding element may form a packet-in message including the packet and then transmit the packet-in message to the controller.

As noted above, an OpenFlow controller may program the rules in a flow table(s) of an OpenFlow forwarding element, and the forwarding element may be limited in the number of flow rules/entries that may be included in its flow table(s). Accordingly, the forwarding element may be unable to store flow rules/entries for all possible communications which it may need to be able to facilitate. As a result, packets of some flows (e.g., a first packet of a new flow) may miss in the primary flow table of the forwarding element, and the miss may trigger the controller to program a new flow rule(s)/entry(ies) into the primary flow table (using a flow modification message or flow mod message) to define a new flow through the forwarding element. In addition, the controller may be required to forward the missed packet from the packet-in message to a correct output port of the forwarding element.

A new flow rule(s)/entry(ies) for a new packet flow between endpoint devices may thus be used to control a flow of data packets between the endpoint devices. Upon passage of a timeout period without receiving any packets matching the new flow rule(s)/entry(ies), the flow rule(s)/entry(ies) may be deleted from the primary flow table to make room for other flow rule(s)/entry(ies).

In some OpenFlow networks, the controller may thus be required to program and reprogram a primary flow table for each new packet flow and for each subsequent occurrence of an expired packet flow, and the controller may also be required to transmit an initial packet for each new packet flow and for each subsequent occurrence of an expired packet flow to a correct output port of the forwarding element. In some deployment scenarios and/or traffic conditions, this traffic of packet-in messages, flow modification messages, and forwarded packets between the forwarding element and controller could overwhelm the OpenFlow channel between the forwarding element and the controller.

FIG. 1 is a block diagram illustrating a network 105 including a plurality of OpenFlow controllers 101-1 to 101-n (controllers) in a control plane and a plurality of OpenFlow forwarding elements 103-1 to 103-m (forwarding elements) in a forwarding plane, with communications between OpenFlow Controllers 101-1 to 101-n and OpenFlow forwarding elements 103-1 to 103-m being provided though an OpenFlow channel (a channel) therebetween in accordance with an OpenFlow protocol(s). The OpenFlow channel may be implemented, for example, using a Transmission Control Protocol (TCP) connection and/or a Stream Control Transmission Protocol (SCTP) connection, and Transport Layer Security (TLS) may be used to communicate encrypted messages between respective controllers and forwarding elements. Moreover, communication paths 111 (separate from the OpenFlow channel) may be provided between OpenFlow forwarding elements 103-1 to 103-m in the forwarding plane to support transmission of data packets between forwarding elements. Communication paths 111 may also provide coupling between two or more remote communication devices/nodes (e.g., a client device and a server device) through one or more of forwarding elements 103-1 to 103-m. In addition, communication paths 115 (separate from the OpenFlow channel) may be provided between controllers 101-1 to 101-n in the control plane to support coordination between controllers.

FIG. 2 is a block diagram illustrating elements of an OpenFlow forwarding element 103 of FIG. 1. As shown, each forwarding element 103 may include a processor 207 coupled with one or more input/output ports 209. Memory 211 may be coupled to processor 207, and memory 211 may be used to store flow table(s) 201, shadow table(s) 221, and/or learning table(s) 223. One or more flow tables 201 may be coupled with processor 207, each flow table may include a plurality of flow rules/entries, and each flow rule/entry may define instructions used to process/forward data packets matching the respective flow rule/entry. Stated in other words, each flow rule/entry may define processing for data packets of a respective data stream(s). Data packets from other forwarding elements may be received at respective input/output ports 209, processed by processor 207 in accordance with respective flow rules/entries from flow table(s) 201, and transmitted from respective input/output ports 209 to other forwarding elements. In addition, processor 207 may be coupled to one or more shadow table(s) 221 and/or learning table(s) 223, and processor 207 may also include a handler 208 configured to program shadow, forwarding, and/or learning tables 221/223 and/or to process data packets in accordance with shadow, forwarding, and/or learning tables 221/223.

Each forwarding element 103 may also include group tables 215 and OpenFlow Secure Channel Interface 203 (a channel interface). More particularly, OpenFlow secure channel interface 203 may provide communications between processor 207 and a respective OpenFlow controller 101 through the OpenFlow Channel of FIG. 1. OpenFlow secure channel interface 203, for example, may use TLS to encrypt/send messages over the OpenFlow Channel to a respective controller and/or to receive/decrypt messages transmitted by the respective controller over the OpenFlow Channel. In the event that a data packet is received through one of input ports 205 and processor 207 cannot match the data packet with a flow rule/entry in flow table(s) 201 and/or in shadow table(s) 221, for example, processor 207 may transmit a packet-in message including the data packet through OpenFlow Secure Channel Interface 203 over the OpenFlow Channel to a respective controller. In the other direction, processor 207 may receive messages from the respective controller over the OpenFlow Channel through OpenFlow Channel interface 203 to change (e.g., add, update, and/or delete) a flow rule(s)/entry(ies) of flow table(s) 201 and/or a shadow rule/entry of shadow table(s) 221.

FIG. 3 is a block diagram illustrating elements of an OpenFlow controller 101 of FIG. 1. As shown, each controller 101 may include a processor 307 coupled between OpenFlow Secure Channel Interface 303 (channel interface) and controller interface 309. OpenFlow Secure Channel Interface 303 may provide communications between processor 307 and a respective OpenFlow forwarding element 103 through the OpenFlow Channel of FIG. 1. OpenFlow secure channel interface 303, for example, may use TLS to encrypt/send messages over the OpenFlow Channel to a respective forwarding element(s) and/or to receive/decrypt messages transmitted by the respective forwarding element(s) over the OpenFlow Channel. OpenFlow controller 101 may also include memory 311 coupled to processor 307.

Operations of OpenFlow forwarding element 103 (a forwarding element) and OpenFlow controller 101 (a controller) of FIGS. 1, 2, and 3 will be discussed in greater detail below with respect to the flow charts of FIGS. 4, 5, and 6. Moreover, each forwarding element of FIG. 1 may have a structure as discussed above with respect FIG. 2, and each controller of FIG. 1 may have a structure as discussed above with respect to FIG. 3.

According to the OpenFlow protocol discussed above, a packet that results in a primary flow table miss at a forwarding element 103 may be sent to a corresponding controller 101 using a packet-in message by default. In response, controller 101 may send a flow mod message to the forwarding element to program a new flow rule in the primary flow table, and controller 101 may also forward the packet that missed to the appropriate port of forwarding element 103. By providing forwarding element 103 with some additional information according to embodiments discussed herein, forwarding element 103 may make a more intelligent decision to offload some functionality from controller 101 and to reduce communication traffic between forwarding element 103 and controller 101 over the OpenFlow channel. Accordingly, controller 101 processing load and/or OpenFlow channel traffic may be reduced.

Packets that arrive at ports 209 of forwarding element 103 may be classified as control packets and data packets. Forwarding element 103 may have to forward control packets to controller 101 for further processing because the control packets are intended to be consumed in the control plane. Data packets that miss matching a flow table 201 of forwarding element 103 may also be forwarded to controller 101 as discussed below.

For a packet miss, forwarding element 103 may generate a packet-in message including the packet that missed, and the packet-in message is transmitted to controller 101. In response, controller 101 generates a flow mod message to install a flow rule/entry in flow table 201 of forwarding element 103, and controller 101 transmits the flow mod message over the OpenFlow channel to forwarding element 101. The flow mod message includes an entire flow rule/entry along with match instructions/actions to be preformed to handle packets of a flow (including the missed packet) in the forwarding plane. In addition, controller 101 transmits a packet-out message including the missed packet to forward the missed packet to a correct output port 209 of forwarding element 103.

Depending on a rate of new flows arriving at forwarding element 103, this sequence may cause the OpenFlow channel between forwarding element 103 and controller 101 to be overwhelmed. Implementing features like firewalls and/or flexible ACL (Access Control List) matching may increase communication traffic on the OpenFlow channel. Controller offload according to some embodiments will be discussed in greater detail below with respect to three use cases illustrated in flow charts of FIGS. 4, 5, and 6.

Figure 4:
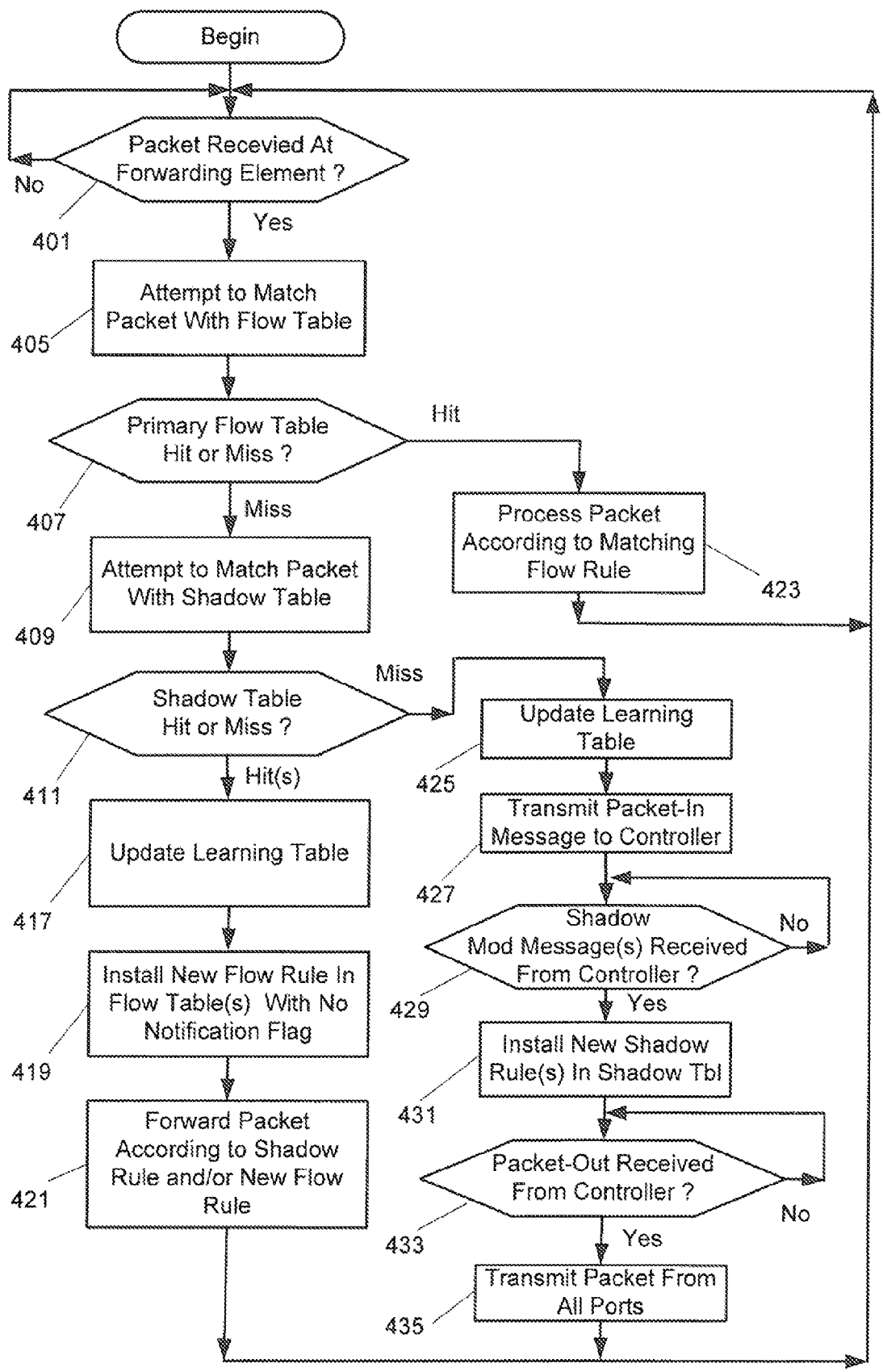
FIGS. 4-6 are flow charts illustrating operations of forwarding elements according to some embodiments.

FIG. 4 is a flow chart illustrating operations of forwarding element 103 to offload controller 101 operations during L2 (Layer 2) bridging type operations. In contrast, a conventional bridging algorithm runs as an application at controller 101 as discussed in greater detail below.

The following bridging operations are performed by conventional OpenFlow forwarding elements and controllers assuming a destination is unknown to support media access control (MAC) communications between two remote network nodes (referred to herein as node A and node B). A packet, for example, may arrive at a port C of a forwarding element with an Ethernet source address A (indicating that node A is the source of the packet) and with an Ethernet destination address B (indicating that node B is the intended destination of the packet). The forwarding element may attempt to match the packet with a primary flow table using the destination address B, but because the destination node is not known to the forwarding element, the packet may miss at the primary flow table (i.e., the destination address B may not match with any flow rules/entries of the primary flow table).

Conventionally, the forwarding element may send a packet-in message over the OpenFlow channel to the controller, and the packet-in message may include the packet that missed and an identification of port C through which the packet was received from node A. Upon receipt of the packet-in message, the controller may look up the Ethernet source address A, and if the controller does not have the Ethernet source address A in a learning table at the controller, then the source address A is recorded in the learning table along with the identification of the port C through which the packet was received.

The controller then generates two flow mod messages that are transmitted over the OpenFlow channel to the forwarding element representing two new rules for the primary flow table of the forwarding element. A first flow mod message defines a first flow rule ("Ethernet Src B: Ethernet Dst *; Action: Output Controller" wherein * represents any address) so that any packet having a source address of B (i.e., a packet transmitted by node B) is forwarded to the controller using a packet-in message. A second flow mod message defines a second flow rule ("Ethernet Dst A; Ethernet Src *; Action: Output C" wherein * represents any address) so that any packet having a destination address A (i.e., a packet being transmitted to node A) is forwarding to the port C through which the original packet was received from node A.

The controller also generates a packet-out message (including the original packet received from node A), and the controller transmits the packet-out message over the OpenFlow channel to the forwarding element to be transmitted from all standard input/output ports (including input/output port C through which the original packet was received from node A). Responsive to receiving the packet-out message from the controller, the forwarding element floods the packet to all input/output ports of the forwarding element (i.e., to transmit the original packet from all input/output ports). By flooding the packet to all input/output ports, the packet may reach node B (the intended destination) even though neither the forwarding element nor the controller knows where the node B is located.

Upon receipt of the original packet at node B, the node B may respond to node A with a second packet including an Ethernet source address B (indicating that node B is the source of the second packet) and with an Ethernet destination address A (indicating that node A is the intended destination of the packet). The second packet may be received at a port D of the forwarding element, and the second packet (including source address B) may thus match the first flow rule. In accordance with the first flow rule ("Ethernet Src B: Ethernet Dst *; Action: Output Controller"), the forwarding element may transmit a packet-in message (including the second packet) to the controller with the packet-in message including an identification of port D through which the packet was received from node B.

Responsive to receiving the packet-in message including the second packet, the controller may look up the Ethernet source address B, and if the controller does not have the Ethernet source address B in the learning table at the controller, then the source address B is recorded in the learning table along with the identification of the port D through which the second packet was received at the forwarding element. The controller may then generate two additional flow mod messages responsive to the packet from the node B.

A first flow mod message responsive to the packet from the node B may be generated and transmitted to the forwarding element to remove the flow rule ("Ethernet Src B: Ethernet Dst *; Action: Output Controller") that was previously programmed into the flow table at the forwarding element responsive to the packet from the node A. A second flow mod message may be generated responsive to the packet from the node B and transmitted to the forwarding element to add a flow rule ("Ethernet Dst B; Ethernet Src *; Output Port D") to the flow table of the forwarding element.

Based on information from the learning table at the controller (relating the destination address A with input/output port C), the controller also generates a packet-out message (including the second packet received from node B), and the controller transmits the packet-out message over the OpenFlow channel to the forwarding element to be transmitted from port C (to which node A is connected). Responsive to receiving the packet-out message from the controller, the forwarding element transmits the packet (originally transmitted from node B) from port C.

Accordingly, the flow table now includes two flow rules for the session between nodes A and B, "Ethernet Dst A; Ethernet Src *; Action: Output C" and "Ethernet Dst B; Ethernet Src *; Output Port D". For any packet matching the flow rule "Ethernet Dst A; Ethernet Src *; Action: Output C" (i.e., any packet having a destination address for node A), the forwarding element will transmit the packet from port C, and for any packet matching the flow rule "Ethernet Dst B; Ethernet Src *; Output Port D" (i.e., any packet having a destination address for node B), the forwarding element will transmit the packet from port D.

In a network including conventional forwarding elements and controllers, the operations discussed above may be performed for each new Ethernet source/destination pair for which a communication session is established through the network. In this scenario, two packet-in messages are transmitted from the forwarding element over the OpenFlow channel to the controller, four flow mod messages are transmitted from the controller over the OpenFlow channel to the forwarding element, and two packet-out messages are transmitted from the controller over the OpenFlow channel to the forwarding element.

According to embodiments illustrated in the flow chart of FIG. 4, the number of communications transmitted over the OpenFlow channel between a forwarding element 103 and a controller 101 and a processing load of controller 101 may be reduced. More particularly, operations of FIG. 4 will be discussed with respect to establishing a communication session between two communication nodes A and B, with communication node A being coupled with a port C of input/output ports 209 of forwarding element 103 and with communication node B being coupled with a port D of input/output ports 209 of forwarding element 103. Moreover, operations of FIG. 4 will be discussed with respect to a communication session between nodes A and B that has not been previously supported by forwarding element.

At block 401, for example, a data packet may be received at port C of forwarding element 401 with an Ethernet source address A (indicating that node A is the source of the packet) and with an Ethernet destination address B (indicating that node B is the intended destination of the packet). Processor 207 of forwarding element 103 may attempt to match the data packet with a primary flow table using the source address A and/or the destination address B at block 405. If the data packet hits a match with a primary flow table (of flow table(s) 201) at block 407 (e.g., because the source and/or destination address of the data packet matches the criteria for an existing flow rule of the primary flow table), forwarding element processor 207 may process the data packet according to the matching flow rule at block 423.

If the data packet misses a match with the primary flow table (of flow table(s) 201) at block 407 (e.g., because the source and/or destination address of the data packet does not match the criteria for an existing flow rule of the primary flow table), forwarding element processor 207 may attempt to match the data packet with shadow table 221 of forwarding element 103 using the source address A and/or destination address B at block 409. If the data packet misses a match with shadow table 221 at block 411, forwarding element processor 207 may update learning table 223 (at forwarding element 103) at block 425 using the source address A of the packet and port C through which the packet was received. More particularly, forwarding element processor 207 may record the source address A in forwarding element learning table 223 along with the identification of port C through which the packet was received thereby associating a source of the data packet (e.g., node A) with an input/output port 209 of forwarding element 103 (e.g., port C) to which the source (e.g., node A) is coupled. In embodiments of FIG. 4, forwarding element 103 may provide/maintain a learning table so that this processing burden can be shifted from controller 101.

At block 427, a packet-in message (including the packet received from node A) may be transmitted over the OpenFlow channel from forwarding element 103 to controller 101. The packet-in message may include the packet that missed and an identification of port C through which the packet was received from node A at forwarding element 103. Responsive to receiving this packet-in message, controller 101 may generate two new shadow mod messages used to program respective shadow rules in shadow table(s) 221 that are transmitted over the OpenFlow channel to forwarding element 103.

A first shadow mod message defines a first flow rule ("Ethernet Dst==MAC A; Action: Output Port C" wherein MAC A is a MAC address of node A) so that any data packet received at forwarding element 103 having a destination address of A (i.e., a data packet being transmitted to node A) is transmitted from port C (which is known to be coupled with node A). A second shadow mod message defines a second flow rule ("Ethernet Src=MAC B; Action: Output Port Local" wherein MAC B is a MAC address of node B, and Port Local is a local virtual port associated with handler 208 of forwarding element processor 207 so that any data packet received at forwarding element 103 having a source address of B (i.e., a data packet being transmitted by node B) is forwarded to handler 208 via the virtual local Port. Responsive to receiving these shadow mod messages over the OpenFlow channel at block 429, forwarding element 103 may install the respective shadow rules in shadow table 221 at block 431.

Controller 101 may also generate a packet-out message (including the original packet received from node A), and controller 101 may transmit the packet-out message over the OpenFlow channel to forwarding element 103 to be transmitted from all standard input/output ports (including input/output port C through which the original packet was received from node A). Responsive to receiving the packet-out message from controller 101 at block 433, forwarding element processor 207 may flood the packet to all forwarding element input/output ports 209 at block 435 (i.e., to transmit the original packet from all input/output ports). By flooding the packet to all input/output ports, the packet may reach node B (the intended destination) even though neither forwarding element 103 nor controller 101 knows where node B is located.

Upon receipt of the original packet at node B, node B may respond to node A with a second packet that is received at forwarding element 103 at block 401. More particularly, the second data packet may include an Ethernet source address B (indicating that node B is the source of the second packet) and an Ethernet destination address A (indicating that node A is the intended destination of the packet). The second packet may be received at a port D of forwarding element input/output ports 209, and processor 207 may attempt to match the second packet with the primary flow table of flow table(s) 201 at block 405. Because no flow rules match with the second data packet, the second data packet may miss matching the primary flow table at block 407.

Accordingly, processor 207 may attempt to match the second packet with shadow table 221 at block 409. As discussed above, with respect to block 431, shadow table 221 has been programmed with the shadow rules "Ethernet Dst==MAC A; Action: Output Port C" and "Ethernet Src=MAC B; Action: Output Port Local", and the second packet (with a destination address A and a source address B) matches both of these rules resulting in Hits at block 411.

Based on the shadow rule "Ethernet Src=MAC B; Action: Output Port Local", processor 207 may forward the second data packet to a local port for processing using handler 208 of processor 207. More particularly, handler 208 may update learning table 223 (at forwarding element 103) at block 417 using the source address B of the packet and port D through which the second data packet was received. More particularly, handler 208 may record the source address B in forwarding element learning table 223 along with the identification of port D through which the packet was received thereby associating a source of the data packet (e.g., node B) with an input/output port 209 of forwarding element 103 (e.g., port D) to which the source (e.g., node B) is coupled. In embodiments of FIG. 4, forwarding element 103 may provide/maintain a learning table so that this processing burden can be shifted from controller 101.

At block 419, handler 208 may also install the following new flow rules in the primary flow table of flow table(s) 201: "Ethernet Dst A; Ethernet Src *; Action: Output C" and "Ethernet Dst B; Ethernet Src *; Output Port D" (where * represents a wildcard address allowing a match with any address). For any packet matching the flow rule "Ethernet Dst A; Ethernet Src *; Action: Output C" (i.e., any packet having a destination address for node A), forwarding element processor 207 will transmit the packet from port C, and for any packet matching the flow rule "Ethernet Dst B; Ethernet Src *; Output Port D" (i.e., any packet having a destination address for node B), forwarding element processor 207 will transmit the packet from port D. These new flow rules may thus be installed without transmitting the second data packet to controller 101.

Because these two new flow rules are installed by forwarding element processor 207 without notifying controller 101, controller 101 may be unaware that these two flow rules have been installed in flow table(s) 201. Accordingly, a "no notification flag" may be installed in flow table(s) 201 for each of these two new flow rules so that no notification is transmitted to controller 101 upon a change(s) in status of either of these flow rules. When either of these flow rules times out (due to a lack of activity between nodes A and B exceeding a timeout period), for example, processor 207 may remove these rules from flow table(s) without notifying controller 101. In contrast, flow rules that are installed responsive to flow mod messages received from controller 101 may be installed without "no notification" flags so that notifications are transmitted to controller 101 when such flow rules are removed from flow table(s) 201 (e.g., responsive to time out).

Based on the shadow rule "Ethernet Dst=MAC A; Action: Output Port C" in shadow table 221, handler 208 may forward the second data packet through port C of input/output ports 209 to node A at block 421. In an alternative, the second data packet may be forwarded through port C to node A in accordance with the new flow rule "Ethernet Dst A; Ethernet Src *; Action: Output C". In either case, the second data packet (transmitted from node B to node A) may be transmitted from forwarding element 103 without transmitting the second data packet to controller 101.

Subsequent data packet transmissions between nodes A and B during the communication session may be handled by forwarding element processor 207 using the two new flow rules ("Ethernet Dst A; Ethernet Src *; Action: Output C" and "Ethernet Dst B; Ethernet Src *; Output Port D") in accordance with blocks 401, 405, 407, and 423 of FIG. 4. More particularly, each data packet transmitted by node A to node B during the session may be received at block 401, matched with the flow rule "Ethernet Dst B; Ethernet Src *; Output Port D" of primary flow table of flow table(s) 201 at blocks 405 and 407, and transmitted from port D in accordance with the matched rule at block 423. Similarly, each data packet transmitted by node B to node A during the session may be received at block 401, matched with the flow rule "Ethernet Dst A; Ethernet Src *; Action: Output C" of primary flow table of flow table(s) 201 at blocks 405 and 407, and transmitted from port C in accordance with the matched rule at block 423.

After a lapse in communications between nodes A and B exceeding a timeout period, processor 207 may remove both flow rules from flow table(s) 201 to free memory space for other flow rules. If communications are later resumed between nodes A and B (after the timeout), operations of blocks 409, 411, 425, 427, 429, 431, 433, 435, 417, 419, and 421 may be repeated to reinstall flow rules for a new session between nodes A and B. In subsequent sessions, a number of required operations may be reduced, for example, if information regarding nodes A and B is maintained in learning table 223 after removing the flow rules relating thereto.

By following operations of FIG. 4, a load of communications over the OpenFlow channel between forwarding element 103 and controller 101 may be reduced, and a processing load at controller 101 may be reduced. Operations of FIG. 4, for example, may require only one packet-in message, one packet-out message, and two shadow mod messages to establish a session between nodes A and B.

Figure 5:
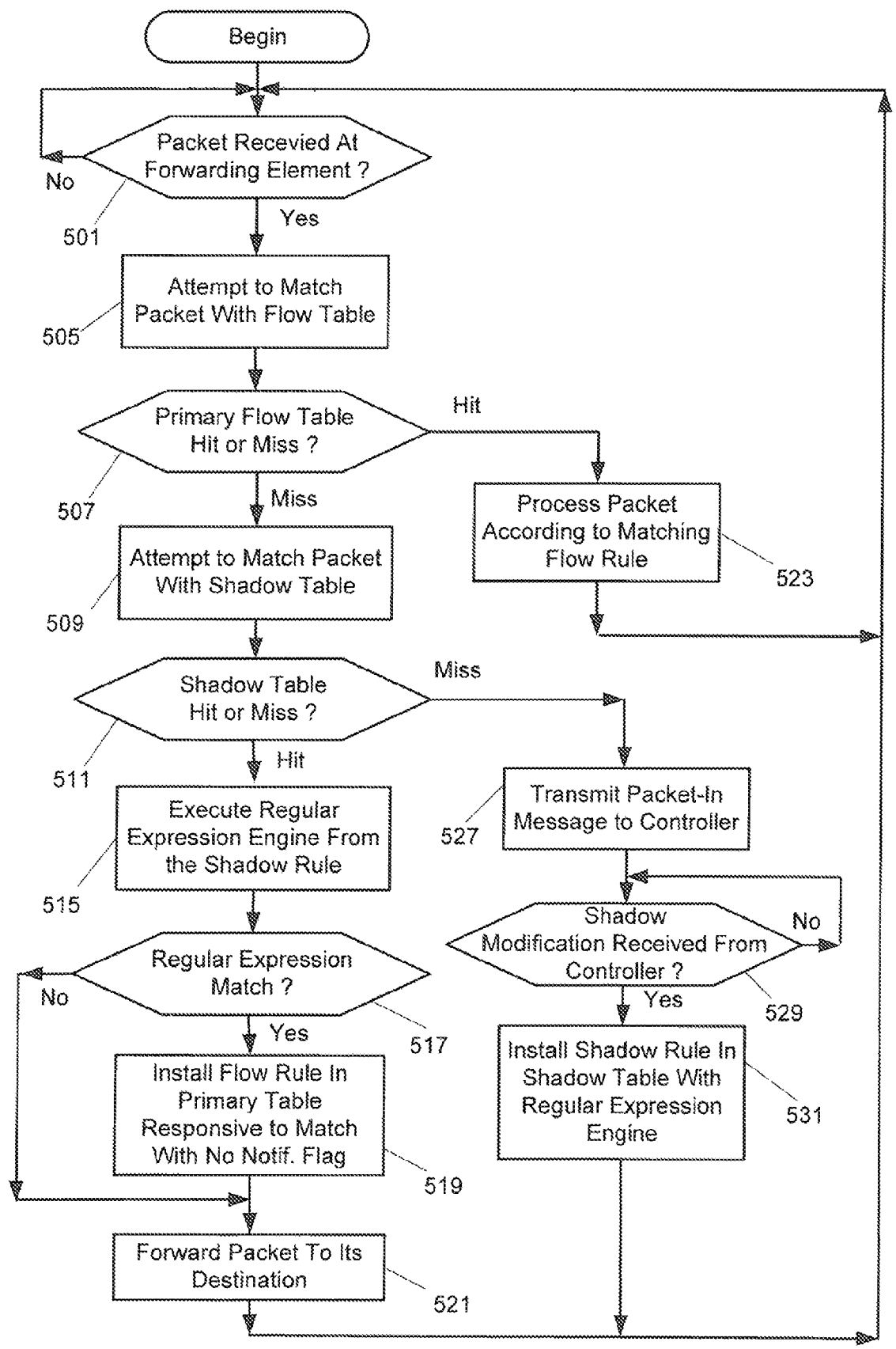

FIG. 5 is a flow chart illustrating operations of forwarding element 103 to offload controller 101 operations during client server communications between a client device and a server device through network 101. More particularly, FIG. 5 illustrates forwarding element 103 operations to open data channel pinholes for forwarding element ports that are negotiated by the client and server devices.

In the File Transfer Protocol (FTP) passive mode, the client device uses a forwarding element control port (e.g., port 21 of input/output ports 209) to provide a control channel for control operations to request data from the server device, but Transmission Control Protocol (TCP) ports between 1024 and 65535 are used to receive the data requested from the server device. PORT/PASV commands are exchanged on the control channel (using the control port) to provide information used to open a specified data channel (using one or more of TCP ports 1024 to 65535) between the client and server devices. When the client device transmits a data request over the control channel to the server device, the server device may respond with a PORT command that identifies a forwarding element port (e.g., one of TCP ports 1024 to 65535) to be used for the data channel or with a PASV command that asks the client device to identify a forwarding element port (e.g., one of TCP ports 1024 to 65535) to be used for the data channel. If the server device responds with a PASV command, the client device may then transmit a PORT command that identifies a forwarding element port (e.g., one of TCP ports 1024 to 65535) to be used for the data channel.

According to some embodiments, controller 101 may install shadow rules in shadow table 221 (e.g., to provide a helper function that inspects packet contents on the control channel) to support client server communications, to reduce processing burden at controller 101, and/or to reduce communication traffic over the OpenFlow channel between forwarding element 103 and controller 101. Such shadow rules may act as a finite state machine (FSM) that searches a set of patterns in packets transmitted over the control channel to identify PORT commands and to take action to open appropriate data channels using port information from the identified PORT commands without requiring communication between forwarding element 103 and controller 101.

In FTP applications, the shadow rules providing the helper function may look for a pattern in each packet transmitted over the control channel wherein the pattern uniquely identifies PORT commands that are sent in response to requests to begin passive mode connections (e.g., the PASV method). If the pattern is found in a packet on the control channel, the shadow rules can implement the data channel without requiring communication with controller 101.

The shadow rules, for example, may provide a regular expression (regex) engine. Controller 101 may install the shadow rules for the helper function (including the regular expression engine) in forwarding element 103 responsive to detecting the TCP SYN (TCP synchronization) and SYN ACK (synchronization acknowledge) sequence transmitted over the control channel through forwarding element 103 between the client and server devices. This mechanism may offload messages of the communication from being seen at controller 101.

The client device IP address, the server device IP address, the client device TCP port, the service device TCP port, and the physical port information associated with reaching the server device IP address and the client device IP address may be provided to forwarding element 103. This information along with the regular expression engine used to parse PORT/PASV commands may be sent from controller 101 to forwarding element 103. The regular expression engine (also referred to as a Regex Engine) used to identify TCP ports from relevant PASV/PORT commands may be provided as follows:

\b(PORT|port|PASV|pasv)\b((25[0-5]|2[0-4][0-9]|[01]?[0-9][0-9]?,){3}\b(25[0-5]|2[0-4][0-9]|[01]?[0-9][0-9]?)\b Moreover, the shadow rules may be programmed in shadow table 221 (responsive to one or more shadow mod messages from controller 101) as follows:

If (Src IP==Client IP and Src Port==Client TCP Port And Dest IP==Server IP And Dest Port==Server TCP Port) OR (Src IP==Server IP And Src Port==Server TCP Port And Dest IP==Client IP And Dest Port==Client Port), then
  Regex Engine (Regex Expression)

The Regular Expression Engine attempts to match the PORT and PASV strings along with IP address and port data to identify TCP ports indentified for data channels between the client and server devices. The data port connection, along with other information like server and client IP addresses can be passed on to the controller so that it can install the rule or so that the rule can be installed by forwarding element 103 without involving controller 101.

Controller 101 may provide sufficient capability to determine a type of conversation/communication and construct the regular expression engine to parse certain strings in the conversations/communications. Controller 101 may still provide intelligence in making the decision on the type of conversation/communication and what to look for. Controller 101 can then install appropriate shadow rules in shadow table 221 of forwarding element 103 using shadow mod messages when a session has been established. Controller 101 may play an important role, but forwarding element 103 may act using the shadow rules to reduce processing load at controller 101. Using the shadow rules that define the desired helper function, forwarding element 103 may offload (from controller 101) operations of examining control packets for specific strings, and upon identifying a match, forwarding element 103 may either inform controller 101 of a port(s) that needs to be opened or forwarding element 103 may install a flow rule(s) itself in flow table 201 without involving controller 101.

FIG. 5 is a flow chart illustrating operations supporting FTP data channel communications between client and server devices according to some embodiments discussed above. According to embodiments illustrated in the flow chart of FIG. 5, the number of communications transmitted over the OpenFlow channel between forwarding element 103 and controller 101 and a processing load of controller 101 may be reduced. More particularly, operations of FIG. 5 will be discussed with respect to establishing a data channel on a TCP port between client and server devices communicating over a control channel.

At block 501, for example, a control packet may be received at a control port (e.g., control port 21) of forwarding element input/output ports 209, and the control packet may have a source (Src) IP address providing an IP address of the source device (one of the client or server devices) and a destination (dest) IP address providing an IP address of the destination device (the other of the client or server devices). Moreover, the control packet may be a first control packet received at the control port of forwarding element 103 for a session between the client and server devices.

Responsive to receiving the control packet, forwarding element processor 207 may attempt to match the control packet with a primary flow table of the flow table(s) at block 505, but the control packet will miss at block 507 because only data packets may match with a flow table(s) 201. When the control packet misses a match with the primary flow table (of flow table(s) 201) at block 507 (e.g., because control packets do not match flow tables), forwarding element processor 207 may attempt to match the control packet with shadow table 221 of forwarding element 103 using the IP source and destination addresses of the control packet and the control channel port of input/output ports 209 through which the control packet was received at block 509.

If the control packet misses a match with shadow table 221 at block 511 (because it is a first control packet received at forwarding element 103 for a session between the client and server devices before shadow rules for the session have been provided), forwarding element processor 207 may transmit a packet-in message (including the control packet) over the OpenFlow channel from forwarding element 103 to controller 101 at block 527. The packet-in message may include the control packet that missed and an identification of a port through which the control packet was received at forwarding element 103. Responsive to receiving this packet-in message, controller 101 may transmit one or more shadow mod messages to forwarding element 103 to install shadow rules that identify port commands for the session between the client and server devices and that open pinholes for data channels for the session.

Responsive to receiving the shadow mod message(s) from controller 101 at block 529, forwarding element processor 207 may install the shadow rules for the session between the client and server devices at block 531. More particularly, the shadow rules may be configured to identify subsequent control packets received over the control channel port over which the first control packet was received (e.g., port 21) and having one of a source or destination IP address matching the source IP address of the first control packet and having the other of a source of destination IP address matching the destination IP address of the first control channel as follows:

If (Src IP==Client IP and Src Port==Client TCP Port And Dest IP==Server IP And Dest Port==Server TCP Port) OR (Src IP==Server IP And Src Port==Server TCP Port And Dest IP==Client IP And Dest Port==Client Port)

For control packets that match these address criteria, the shadow rules are further configured to execute a regular expression engine to determine whether the control packet is a port command identifying a port for a data channel as follows:

\b(PORT|port|PASV|pasv)\b((25[0-5]|2[0-4][0-9]|[01]?[0-9][0-9]?,){3}\b(25[0-5]|2[0-4][0-9]|[01]?[0-9][0-9]?)\b Upon receipt at forwarding element 103 at block 501 of a second control packet relating to the session between the client and server devices discussed above, forwarding element processor 207 may attempt to match the second control packet with a primary flow table of flow table(s) 201 at block 505, and a miss will occur at block 507 because control packets may not match with flow tables. At block 509, processor 207 may attempt to match the second control packet with shadow table 221, and a hit will occur at block 511 because the second control packet matches the source and destination IP addresses and control port criteria discussed above with respect to the shadow rules of block 531. Stated in other words, the second control packet for the session between the client and server devices matches the source and destination IP addresses and control port of the first control packet for the session between the client and server devices.

Responsive to the shadow table hit, processor 207 will execute at block 515 the regular expression engine from the shadow rule(s) in shadow table 221 (discussed above with respect to block 531). The regular expression engine identifies of type of the second control packet, and if the second control packet type does not match a type of interest (e.g., a port command), processor 207 may forward the control packet to an intended destination (e.g., as indicated by the destination IP address) at block 521 without installing a flow rule or rules. If the second control packet does match a type of interest (e.g., a port command), processor 207 may install a new flow rule(s) in a primary flow table of flow table(s) 201 at block 519 and forward the control packet to an intended destination at block 521.

In embodiments discussed herein, the regular expression engine may be used to identify port commands (e.g., PORT and/or PASV commands) as a command type of interest. When the second control packet is identified being a port command control packet at block 517, the regular expression engine of shadow table 221 may identify a TCP port included in the port command data packet to be used for a pinhole for a data channel between the client and server devices, and at block 519, processor 207 may install flow rules in a primary flow table of flow table(s) 201 to support the data channel using the identified TCP port. The second control packet may thus be a port command control packet identifying a data port to be used for subsequent data packets transmitted between the client and server devices, and installing the new flow rule(s) at block 519 may include installing the new flow rule(s) to define a pinhole to be used for subsequent data packets transmitted through forwarding element 103 between the client and server devices. Moreover, these flow rule(s) may be installed together with a no notification flag so that when the pinhole data channel times out (due to a lapse in activity exceeding a timeout period), the flow rule(s) may be removed from flow table(s) 201 without notifying controller 101.

Once the flow rule(s) defining the data channel pinhole have been installed, subsequent data packets transmitted between the client and server devices may be transmitted over the data channel pinhole defined by the flow rule(s). For example, a data packet may be transmitted between the client and server devices (e.g., a data packet including source and destination addresses corresponding to the session between the client and server devices), and upon receipt of this data packet at block 501, processor 207 may attempt to match the data packet with a primary flow table of flow table(s) 201. Because the data packet is for the session between the client and server devices discussed above, the data packet may have a source IP address matching one of the source or destination IP addresses of the first and/or second control packets, and the data packet may have a destination IP address matching the other of the source or destination IP addresses of the first and/or second control packets. Accordingly, when processor 207 attempts to match the data packet with a primary table of flow table(s) 201, the data packet will hit on the flow rules defining the data channel pinhole discussed above at block 519. Accordingly, the data packet will be processed according to the matching flow rule(s) so that the data packet is transmitted through the forwarding element using the data channel pinhole defined by the matching flow rule(s). Any number of subsequent data packets may be transmitted using the data channel pinhole either until the flow rule(s) defining the data channel pinhole timeout (due to a lack of activity over the data channel pinhole exceeding a timeout period) or until another data channel pinhole is established.

According to embodiments discussed above with respect to FIG. 5, forwarding element processor 207 may thus glean TCP data ports for data communications between client and server devices using shadow rules to monitor control channel packets transmitted between the client and server devices. Using this information, forwarding element processor 207 may open a data channel pinhole between the client and server devices without involving controller 101. Accordingly, controller 101 may be saved the burden of monitoring every control packet of a communication/conversation between the client and server devices and/or the burden of opening data channel pinholes.

Figure 6:
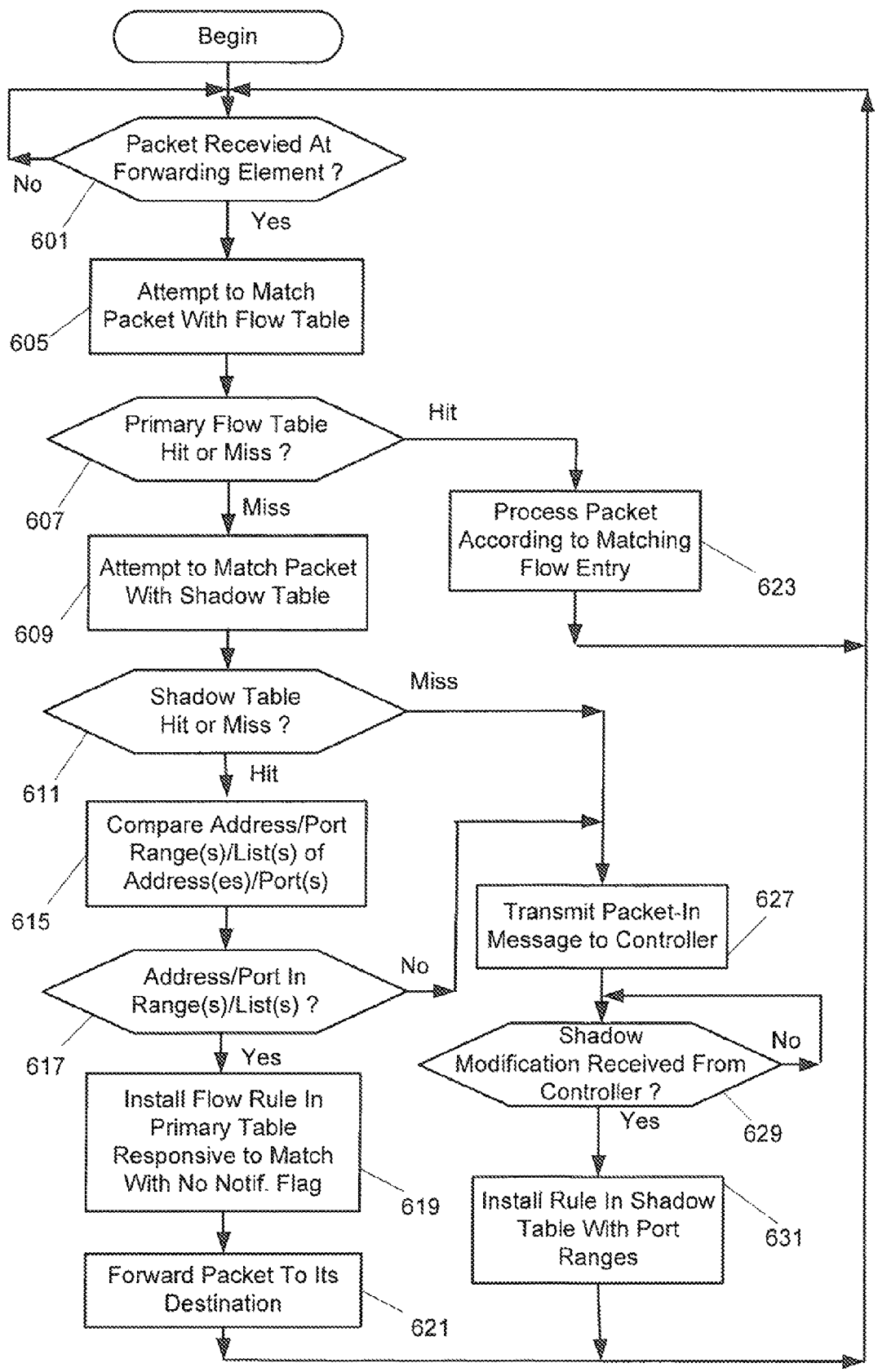

FIG. 6 is a flow chart illustrating operations of forwarding element 103 to offload controller 101 operations by implementing flexible rule matching. In an Access Control List (ACL) type implementation, for example, a range or ranges of input/output ports 209 may be used for flow table rule matching. If packets received through input/output ports in the range of 50,001-50,010 should hit in a flow table without flexible rule matching, for example, a same flow rule may need to be programmed 10 times with each of the 10 flow rules including the same source and destination IP addresses and a different one of the 10 ports in the designated range.

By way of example, FIG. 7 illustrates flow rule matching criteria for two rules for one port used to pass traffic between client and server devices in both directions without flexible rule matching. In the first rule, a match occurs when a packet has an IP source address of the server device, an IP destination address of the client device, a source port of 50,001, and a destination port of 50,002. In the second rule, a match occurs when a packet has an IP source address of the client device, an IP destination address of the server device, a source port of 50,002, and a destination port of 50,001. If a flow rule is implemented for a range of ports without flexible rule matching, the matching rules of FIG. 7 may need to be repeated for each port of the range, increasing the cost of implementation Implementation over multiple and nonconsecutive ranges of ports (also referred to as a range with a hole or holes) may further increase cost.

Flow rules for flexible rule matching, for example, may be expressed using key words such as "range", "list", and "exclude", "IP" (Internet Protocol), "port", "MAC" (Media Access Control) address, "source" address, and "destination" address. By way of example, the exclude keyword can be followed by a range or list with a combination of any other keywords. With this notation, a number of cases can be covered to express a compact rule space. These key words may be implemented with data structures that can express the data to process notions. These mechanisms may be used to efficiently implement rules such as:

a. source IP Destination IP Port range N1 to N2 exclude N, N1<N<N2 source 172.16.10.100 dest 171.16.23.1 dest port range 10 to 30 exclude port 20 b. dest IP address Range A.B.C.0/24 to A.B.C.D/24 exclude A.B.C.P, 0<P<D source 172.16.10.0/24 to 172.16.10.20/24 exclude 172.16.10.2 source port 049200 dest port 50,000 c. list IP A.B.C.D, E.F.G.H, A1.B1.C1.D1 port list p1, p2, p3 list ip 172.16.10.1, 172.16.10.3, 172.16.10.4 port list 22, 23, 24, 25

An address or port can be qualified by a source or destination keyword. If an address or port is not qualified with a source or destination keyword, the address or port may be interpreted as a destination address or port. Range indicates a range of ports with a high marker and a low marker. The keyword "List" identifies a list of addresses or ports.

The "exclude" keyword excludes everything up to a keyword, and the "exclude" keyword can be associated with a range or a list to exclude. Anything not qualified by an exclude range or list may be accepted. The keywords "IP", "MAC", and "port" refer to the IP address, MAC address, and TCP/UDP/SCTP port respectively. This ACL type language may be implemented at forwarding element 103 by having controller 101 send parsed rules in shadow mod messages to install shadow rules (with ranges) in shadow table 221 at forwarding element 103.

Forwarding element 103 operations to implement shadow rule ranges are discussed in greater detail below with respect to FIG. 6 regarding communications between client and server devices through forwarding element 103.

At block 601, for example, a packet (e.g., a control or data packet) may be received at a port of forwarding element input/output ports 209, and the packet may have a source (Src) IP address providing an IP address of the source device (one of the client or server devices) and a destination (dest) IP address providing an IP address of the destination device (the other of the client or server devices). Moreover, the packet may be a first packet received at forwarding element 103 for a session between the client and server devices.

Responsive to receiving the packet, forwarding element processor 207 may attempt to match the packet with a primary flow table of the flow table(s) at block 605, but the packet may miss at block 607 because a session between the client and server devices has not yet been established. If the control packet misses a match with the primary flow table (of flow table(s) 201) at block 607 (e.g., because the packet does not match any flow rules of flow table 201), forwarding element processor 207 may attempt to match the packet with shadow table 221 of forwarding element 103 using the IP source and destination addresses of the control packet at block 609.

If the control packet misses a match with shadow table 221 at block 611 (because it is a first packet received at forwarding element 103 for a session between the client and server devices before shadow rules for the session have been provided), forwarding element processor 207 may transmit a packet-in message (including the packet) over the OpenFlow channel from forwarding element 103 to controller 101 at block 627. The packet-in message may include the packet that missed. Responsive to receiving this packet-in message, controller 101 may transmit one or more shadow mod messages to forwarding element 103 to install a shadow rule(s) that defines a flow rule(s) and that identify a range(s)/list(s) of IP addresses, MAC addresses, and/or TCP/UDP/SCTP ports to be associated with the flow rule(s) of the shadow mod message(s).

Responsive to receiving the shadow mod message(s) from controller 101 at block 629, forwarding element processor 207 may install the shadow rule(s) for the session between the client and server devices at block 631. More particularly, the shadow rule(s) may be configured to identify subsequent control packets received at forwarding element 103 using the range(s)/list(s) of addresses and/or ports discussed above. A subsequent packet of the communication session between the client and server devices may thus trigger generation of a new flow rule for flow table(s) 201 if it matches the range(s)/list(s) of addresses and/or ports.

After installing the shadow rule, a second packet of the communication session between the client and server devices may be received at block 601, and processor 207 may attempt to match the second packet with a primary flow table of flow table(s) 201 at block 605. A miss may occur at block 607 because flow rules for the communication session between the client device and the server device have not yet been installed. At block 609, processor 207 may attempt to match the second control packet with shadow table 221, and a hit may occur at block 611 because a source and/or destination of the second packet matches a source and/or destination address of the first packet that triggered installation of the shadow rule at block 631.

Responsive to the shadow table hit, processor 207 compares at block 615 an address and/or port from the packet with the range(s)/list(s) of addresses/ports of the shadow rule. If the address/port of the packet is included in the range(s)/list(s) of the shadow rule at block 617, processor 207 may install a flow rule in the primary flow table of flow table(s) at block 619 wherein the flow rule includes match criteria for the source address and/or destination address used to identify the communication session between the client device and the server device (e.g., the source and destination addresses of the two packets discussed above that triggered generation of the flow rule) and the address and/or port of the second packet that matched with the range(s)/list(s) at blocks 615 and 617. At block 621, processor 207 may forward the second packet to its intended destination. If the address/port of the packet is not included in the range(s)/list(s) of the shadow rule at block 617, a packet-in message may be transmitted at block 627, and operations of blocks 629 and 631 may be performed as discussed above.

Once a new flow rule is installed at block 619, subsequent packets for the communication between the client device and the server device that meet all criteria of the flow rule may be processed according to operations of blocks 601, 605, 607, and 623 for the duration of the communication session. More particularly, the new flow rule may only apply to packets of the communication session that have the address/port that matched the range(s)/list(s) when the new flow rule was installed. Other packets of the communication that do not have the matching address/port may thus be compared with the previous shadow rule at blocks 609, 611, 615, and 617. If another packet misses at blocks 605 and 607 but matches the range(s)/list(s) at blocks 611, 615, and 617, another flow rule may be created with a different address/port (relative to that of the first flow rule discussed above) required for a flow table match. If another packet misses at blocks 605 and 607 and at 611 or 617, a packet-in message may be transmitted to controller 101 at block 627 to trigger generation of another shadow rule.

According to embodiments discussed above with respect to FIG. 6, a shadow rule may be installed to generate a same flow rule over a range(s)/list(s) of addresses/ports. Instead of generating the same flow rule for all possible addresses/ports over a range, the flow rule may only be generated for particular addresses/ports that have actually been used for communication between the client device and the server device thereby reducing memory space consumed by flow table(s) 201. Moreover, by installing the shadow rule(s) with intelligence to generate the respective flow rule(s) over the designated range(s)/list(s) of addresses/ports, communications traffic over the OpenFlow channel between forwarding element 103 and controller 101 may be reduced and/or a processing load at controller 101 may be reduced.

Embodiments discussed above may be implemented as modifications and/or extensions of a base OpenFlow protocol. According to some embodiments, implementation may be provided as vendor specific extensions of OpenFlow 1.0, 1.1, and/or 1.2 without changing the base protocol.

Embodiments discussed above with respect to FIGS. 4, 5, and 6 may reduce traffic over the OpenFlow channel between forwarding element 103 and controller 101, and/or reduce load at controller 101. In addition, sizes of flow table(s) 201 may be reduced and/or use of flow table rule space may be improved/optimized. By inserting these flows in a shadow table at a time of configuration for a communication session between to devices (e.g., between a client device and a server device), use of the OpenFlow channel may be improved/optimized by allowing only real control traffic to be passed along to controller 101.

According to some embodiments, each miss at flow table 201 may result in four or fewer messages across the OpenFlow channel so that a number of messages across the OpenFlow channel may be reduced by a factor of two or more. By intelligently populating the shadow/flow table(s) at a time of initialization, traffic on the OpenFlow channel can be reduced.

In addition, improved security may be provided by embodiments of FIG. 5 because the pinholes that are opened can be very specific and can be programmed relatively late when the packet that arrived misses in the primary flow table.

In the above-description of various embodiments of the present invention, it is to be understood that the terminology used herein is for the purpose of describing particular embodiments only and is not intended to be limiting of the invention. Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of this specification and the relevant art and will not be interpreted in an idealized or overly formal sense expressly so defined herein.

When an element is referred to as being "connected", "coupled", "responsive", or variants thereof to another element, it can be directly connected, coupled, or responsive to the other element or intervening elements may be present. In contrast, when an element is referred to as being "directly connected", "directly coupled", "directly responsive", or variants thereof to another element, there are no intervening elements present. Like numbers refer to like elements throughout. Furthermore, "coupled", "connected", "responsive", or variants thereof as used herein may include wirelessly coupled, connected, or responsive. As used herein, the singular forms "a", "an" and "the" are intended to include the plural forms as well, unless the context clearly indicates otherwise. Well-known functions or constructions may not be described in detail for brevity and/or clarity. The term "and/or" includes any and all combinations of one or more of the associated listed items.

As used herein, the terms "comprise", "comprising", "comprises", "include", "including", "includes", "have", "has", "having", or variants thereof are open-ended, and include one or more stated features, integers, elements, steps, components or functions but does not preclude the presence or addition of one or more other features, integers, elements, steps, components, functions or groups thereof. Furthermore, as used herein, the common abbreviation "e.g.", which derives from the Latin phrase "exempli gratia," may be used to introduce or specify a general example or examples of a previously mentioned item, and is not intended to be limiting of such item. The common abbreviation "i.e.", which derives from the Latin phrase "id est," may be used to specify a particular item from a more general recitation.

Example embodiments are described herein with reference to block diagrams and/or flowchart illustrations of computer-implemented methods, apparatus (systems and/or devices) and/or computer program products. It is understood that a block of the block diagrams and/or flowchart illustrations, and combinations of blocks in the block diagrams and/or flowchart illustrations, can be implemented by computer program instructions that are performed by one or more computer circuits. These computer program instructions may be provided to a processor circuit of a general purpose computer circuit, special purpose computer circuit, and/or other programmable data processing circuit to produce a machine, such that the instructions, which execute via the processor of the computer and/or other programmable data processing apparatus, transform and control transistors, values stored in memory locations, and other hardware components within such circuitry to implement the functions/acts specified in the block diagrams and/or flowchart block or blocks, and thereby create means (functionality) and/or structure for implementing the functions/acts specified in the block diagrams and/or flowchart block(s).

These computer program instructions may also be stored in a tangible computer-readable medium that can direct a computer or other programmable data processing apparatus to function in a particular manner, such that the instructions stored in the computer-readable medium produce an article of manufacture including instructions which implement the functions/acts specified in the block diagrams and/or flowchart block or blocks.

A tangible, non-transitory computer-readable medium may include an electronic, magnetic, optical, electromagnetic, or semiconductor data storage system, apparatus, or device. More specific examples of the computer-readable medium would include the following: a portable computer diskette, a random access memory (RAM) circuit, a read-only memory (ROM) circuit, an erasable programmable read-only memory (EPROM or Flash memory) circuit, a portable compact disc read-only memory (CD-ROM), and a portable digital video disc read-only memory (DVD/BlueRay).

The computer program instructions may also be loaded onto a computer and/or other programmable data processing apparatus to cause a series of operational steps to be performed on the computer and/or other programmable apparatus to produce a computer-implemented process such that the instructions which execute on the computer or other programmable apparatus provide steps for implementing the functions/acts specified in the block diagrams and/or flowchart block or blocks. Accordingly, embodiments of the present invention may be embodied in hardware and/or in software (including firmware, resident software, micro-code, etc.) that runs on a processor such as a digital signal processor, which may collectively be referred to as "circuitry," "a module" or variants thereof.

It should also be noted that in some alternate implementations, the functions/acts noted in the blocks may occur out of the order noted in the flowcharts. For example, two blocks shown in succession may in fact be executed substantially concurrently or the blocks may sometimes be executed in the reverse order, depending upon the functionality/acts involved. Moreover, the functionality of a given block of the flowcharts and/or block diagrams may be separated into multiple blocks and/or the functionality of two or more blocks of the flowcharts and/or block diagrams may be at least partially integrated. Finally, other blocks may be added/inserted between the blocks that are illustrated. Moreover, although some of the diagrams include arrows on communication paths to show a primary direction of communication, it is to be understood that communication may occur in the opposite direction to the depicted arrows.

Many different embodiments have been disclosed herein, in connection with the above description and the drawings. It will be understood that it would be unduly repetitious and obfuscating to literally describe and illustrate every combination and subcombination of these embodiments. Accordingly, the present specification, including the drawings, shall be construed to constitute a complete written description of various example combinations and subcombinations of embodiments and of the manner and process of making and using them, and shall support claims to any such combination or subcombination.

Many variations and modifications can be made to the embodiments without substantially departing from the principles of the present invention. All such variations and modifications are intended to be included herein within the scope of the present invention.

What is claimed is:

1. A method of operating a forwarding element in a forwarding plane of a network including the forwarding plane and a control plane, the method comprising:
   receiving a packet through an input/output port of the forwarding element in the forwarding plane;
   attempting to match the packet with a flow table of the forwarding element in the forwarding plane;
   responsive to the packet missing a match with the flow table in the forwarding plane, attempting to match the packet with a shadow table of the forwarding element in the forwarding plane; and
   responsive to the packet missing a match with the flow table and matching with a shadow rule of the shadow table, installing a new flow rule in the flow table based on the shadow rule from the shadow table matching the packet.

2. The method according to claim 1 wherein installing the new flow rule comprises installing the new flow rule in the flow table based on the shadow rule from the shadow table matching the packet without transmitting the packet from the forwarding element to a control plane of the network.

3. The method according to claim 1 further comprising:
   processing the packet through the forwarding element according to the shadow rule from the shadow table matching the packet and/or according to the new flow rule.

4. A method of operating a forwarding element in a forwarding plane of a network including the forwarding plane and a control plane, the method comprising:
   receiving a packet through an input/output port of the forwarding element in the forwarding plane;
   attempting to match the packet with a flow table of the forwarding element in the forwarding plane;
   responsive to the packet missing a match with the flow table in the forwarding plane, attempting to match the packet with a shadow table of the forwarding element in the forwarding plane; and
   responsive to the packet missing a match with the flow table in the forwarding plane and responsive to the packet missing a match with the shadow table in the forwarding plane, transmitting a packet-in message to a controller in the control plane of the network, wherein the packet-in message includes the packet.

5. The method according to claim 4 wherein the packet comprises a data packet, the method further comprising:
   responsive to the data packet missing a match with the flow table and responsive to the data packet missing a match with the shadow table, updating a learning table of the forwarding element to associate a source of the data packet with the input/output port.

6. The method according to claim 5 wherein the data packet is a first data packet, the method further comprising:
   responsive to receiving a shadow modification message from the controller corresponding to the packet-in message, installing a shadow rule in the shadow table associating subsequent data packets from a source identified by a destination address of the first data packet with a virtual internal port of the forwarding element;
   after installing the shadow rule, receiving a second data packet through an input/output port of the forwarding element, wherein the second data packet has a source address matching the destination address of the first data packet;
   attempting to match the second data packet with the flow table of the forwarding element;
   responsive to the second data packet missing a match with the flow table, attempting to match the second data packet with the shadow table of the forwarding element;
   responsive to the second data packet matching the shadow rule of the shadow table, installing a new flow rule in the flow table based on the shadow rule from the shadow table matching the second data packet; and
   processing the second data packet through the forwarding element according to the shadow rule from the shadow table matching the second data packet and/or according to the new flow rule.

7. The method according to claim 4 wherein the packet is a first control packet received at a control port of the forwarding element for a session between a client device and a server device, the method further comprising:
   responsive to receiving a shadow modification message from the controller corresponding to the packet-in message, installing a shadow rule in the shadow table matching subsequent control packets received at the control port and having a source address matching either of a source and/or destination address of the first control packet and/or having a destination address matching either of the source and/or destination address of the first control packet wherein the shadow rule identifies port commands from matching control packets;
   after installing the shadow rule, receiving a second control packet through the control port of the forwarding element, wherein the second control packet has a source address matching either of the source and/or destination address of the first control packet and/or a destination address matching either of the source and/or destination address of the first control packet;
   attempting to match the second control packet with the flow table of the forwarding element;
   responsive to the second control packet missing a match with the flow table, attempting to match the second control packet with the shadow table of the forwarding element;
   responsive to the second control packet matching the shadow rule of the shadow table, executing an expression engine of the shadow rule to identify a command type of the second control packet;
   responsive to identifying a command type of the second control packet, installing a new flow rule in the flow table based on the command type of the second control packet; and forwarding the second control packet from an input/output port of the forwarding element to a destination.

8. The method according to claim 7 wherein the second control packet comprises a port command control packet identifying a data port to be used for subsequent data packets transmitted between the client and server devices, wherein installing the new flow rule comprises installing the new flow rule to define a pinhole to be used for subsequent data packets transmitted between the client and server devices, the method further comprising:
after installing the new flow rule, receiving a data packet having a source address matching either of a source and/or destination address of the first control packet and/or having a destination address matching either of the source and/or destination address of the first control packet;
attempting to match the data packet with the flow table of the forwarding element; and
responsive to the data packet matching with the new flow rule of the flow table, processing the data packet in accordance with the pinhole defined by the new flow rule.

9. The method according to claim 4 wherein the packet is a first packet, the method further comprising:
responsive to receiving a shadow modification message from the controller corresponding to the packet-in message, installing a shadow rule in the shadow table defining a range/list of addresses and/or ports and a new flow rule associated with a source and/or a destination address of the first packet;
after installing the shadow rule, receiving a second packet through an input/output port of the forwarding element, wherein the second packet has a source address matching either of the source and/or destination address of the first packet and/or a destination address matching either of the source and/or destination address of the first packet;
attempting to match the second packet with the flow table of the forwarding element;
responsive to the second packet missing a match with the flow table, attempting to match the second packet with the shadow table of the forwarding element;
responsive to the second packet matching the shadow rule of the shadow table, comparing a source and/or a destination port of the second packet with the range/list of addresses and/or ports defined by the shadow rule;
responsive to the source and/or destination port of the second packet matching the range/list of addresses and/or ports defined by the shadow rule, installing a new flow rule in the flow table for packets having a source address matching the source and/or destination address of the first packet and/or having a destination address matching the source and/or destination address of the first packet and having the address and/or port from the second packet; and
forwarding the second packet from an input/output port of the forwarding element to a destination.

10. The method according to claim 9, the method further comprising:
after installing the new flow rule, receiving a third packet having a source address matching either of a source and/or destination address of the first packet and/or having a destination address matching either of the source and/or destination address of the first packet and having the address and/or port from the second packet;
attempting to match the third packet with the flow table of the forwarding element; and responsive to the data packet matching with the new flow rule of the flow table, processing the data packet in accordance with the new flow rule.

11. A forwarding element in a forwarding plane of a network including the forwarding plane and a control plane, the forwarding element comprising:
a plurality of input/output ports configured to provide communications with other forwarding elements of the forwarding plane; and
a processor coupled to the plurality of input/output ports wherein the processor is configured to receive a packet through an input/output port of the forwarding element in the forwarding plane, to attempt to match the packet with a flow table of the forwarding element in the forwarding plane, to attempt to match the packet with a shadow table of the forwarding element in the forwarding plane responsive to the packet missing a match with the flow table, and to install a new flow rule in the flow table based on a shadow rule from the shadow table matching the packet responsive to the packet missing a match with the flow table and matching with the shadow rule of the shadow table.

12. The forwarding element according to claim 11 wherein the processor is configured to install the new flow rule in the flow table based on the shadow rule from the shadow table matching the packet without transmitting the packet from the forwarding element to a control plane of the network.

13. The forwarding element according to claim 11 wherein the processor is further configured to process the packet through the forwarding element according to the shadow rule from the shadow table matching the packet and/or according to the new flow rule.

14. A forwarding element in a forwarding plane of a network including the forwarding plane and a control plane, the forwarding element comprising:
a plurality of input/output ports configured to provide communications with other forwarding elements of the forwarding plane; and
a processor coupled to the plurality of input/output ports wherein the processor is configured to receive a packet through an input/output port of the forwarding element in the forwarding plane, to attempt to match the packet with a flow table of the forwarding element in the forwarding plane, to attempt to match the packet with a shadow table of the forwarding element in the forwarding plane responsive to the packet missing a match with the flow table, and to transmit a packet-in message to a controller in the control plane of the network responsive to the packet missing a match with the flow table in the forwarding plane and responsive to the packet missing a match with the shadow table in the forwarding plane, wherein the packet-in message includes the packet.

15. The forwarding element according to claim 14 wherein the packet comprises a data packet, and wherein the processor is further configured to update a learning table of the forwarding element to associate a source of the data packet with the input/output port responsive to the data packet missing a match with the flow table and responsive to the data packet missing a match with the shadow table.

16. The forwarding element according to claim 15 wherein the data packet is a first data packet, and wherein the processor is further configured to install a shadow rule in the shadow table associating subsequent data packets from a source identified by a destination address of the first data packet with a virtual internal port of the forwarding element responsive to receiving a shadow modification message from the controller corresponding to the packet-in message, to receive a second data packet through an input/output port of the forwarding element after installing the shadow rule wherein the second data packet has a source address matching the destination address of the first data packet, to attempt to match the second data packet with the flow table of the forwarding element, to attempt to match the second data packet with the shadow table of the forwarding element responsive to the second data packet missing a match with the flow table, to install a new flow rule in the flow table based on a shadow rule from the shadow table matching the second data packet responsive to the second data packet matching the shadow rule of the shadow table, and to process the second data packet through the forwarding element according to the shadow rule from the shadow table matching the second data packet and/or according to the new flow rule.

17. The forwarding element according to claim 14 wherein the packet is a first control packet received at a control port of the forwarding element for a session between a client device and a server device, and wherein the processor is further configured to install a shadow rule in the shadow table matching subsequent control packets received at the control port and having a source address matching either of a source and/or destination address of the first control packet and/or having a destination address matching either of the source and/or destination address of the first control packet wherein the shadow rule identifies port commands from matching control packets responsive to receiving a shadow modification message from the controller corresponding to the packet-in message, to receive a second control packet through the control port of the forwarding element after installing the shadow rule wherein the second control packet has a source address matching either of the source and/or destination address of the first control packet and/or a destination address matching either of the source and/or destination address of the first control packet, to attempt to match the second control packet with the flow table of the forwarding element, to attempt to match the second control packet with the shadow table of the forwarding element responsive to the second control packet missing a match with the flow table, to execute an expression engine of the shadow rule to identify a command type of the second control packet responsive to the second control packet matching the shadow rule of the shadow table, to install a new flow rule in the flow table based on the command type of the second control packet responsive to identifying a command type of the second control packet, and to forward the second control packet from an input/output port of the forwarding element to a destination.

18. The forwarding element according to claim 17 wherein the second control packet comprises a port command control packet identifying a data port to be used for subsequent data packets transmitted between the client and server devices, wherein the processor is configured to install the new flow rule to define a pinhole to be used for subsequent data packets transmitted between the client and server devices, to receive a data packet after installing the new flow rule wherein the data packet has a source address matching either of a source and/or destination address of the first control packet and/or a destination address matching either of the source and/or destination address of the first control packet, to attempt to match the data packet with the flow table of the forwarding element, and to process the data packet in accordance with the pinhole defined by the new flow rule responsive to the data packet matching with the new flow rule of the flow table.

19. The forwarding element according to claim 14 wherein the packet is a first packet, and wherein the processor is further configured to install a shadow rule in the shadow table defining a range/list of addresses and/or ports and a new flow rule associated with a source and/or a destination address of the first packet responsive to receiving a shadow modification message from the controller corresponding to the packet-in message, to receive a second packet through an input/output port of the forwarding element after installing the shadow rule wherein the second packet has a source address matching either of the source and/or destination address of the first packet and/or a destination address matching either of the source and/or destination address of the first packet, to attempt to match the second packet with the flow table of the forwarding element, to attempt to match the second packet with the shadow table of the forwarding element responsive to the second packet missing a match with the flow table, to compare a source and/or a destination port of the second packet with the range/list of addresses and/or ports defined by the shadow rule responsive to the second packet matching the shadow rule of the shadow table, to install a new flow rule in the flow table for packets having a source address matching the source and/or destination address of the first packet and/or having a destination address matching the source and/or destination address of the first packet and having the address and/or port from the second packet responsive to the source and/or destination port of the second packet matching the range/list of addresses and/or ports defined by the shadow rule, and to forward the second packet from an input/output port of the forwarding element to a destination.

20. The forwarding element according to claim 19 wherein the processor is further configured to receive a third packet after installing the new flow rule wherein the third packet has a source address matching either of a source and/or destination address of the first packet and/or a destination address matching either of the source and/or destination address of the first packet, to attempt to match the data packet with the flow table of the forwarding element, and to process the packet in accordance with the new flow rule responsive to the data packet matching with the new flow rule of the flow table.

* * * * *